US011882634B2

(12) United States Patent
Han

(10) Patent No.: US 11,882,634 B2
(45) Date of Patent: Jan. 23, 2024

(54) LED LIGHTING APPARATUS AND OPERATING METHOD THEREOF

(71) Applicant: SAMSUNG ELECTRONICS CO., LTD., Suwon-si (KR)

(72) Inventor: Deokhee Han, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 17/380,854

(22) Filed: Jul. 20, 2021

(65) Prior Publication Data

US 2022/0159806 A1 May 19, 2022

(30) Foreign Application Priority Data

Nov. 19, 2020 (KR) ........................ 10-2020-0155462

(51) Int. Cl.

| | |
|---|---|
| ***H05B 45/46*** | (2020.01) |
| ***H05B 45/325*** | (2020.01) |
| ***H05B 45/375*** | (2020.01) |
| ***H05B 45/10*** | (2020.01) |
| ***H05B 45/20*** | (2020.01) |

(52) U.S. Cl.

CPC ............. *H05B 45/46* (2020.01); *H05B 45/10* (2020.01); *H05B 45/20* (2020.01); *H05B 45/325* (2020.01); *H05B 45/375* (2020.01)

(58) Field of Classification Search

CPC ........ H05B 45/46; H05B 45/10; H05B 45/20; H05B 45/325; H05B 45/375

See application file for complete search history.

(56) References Cited

U.S. PATENT DOCUMENTS

| | | | |
|---|---|---|---|
| 6,372,608 | B1 | 4/2002 | Shimoda et al. |
| 6,645,830 | B2 | 11/2003 | Shimoda et al. |
| RE38,466 | E | 3/2004 | Inoue et al. |
| 6,818,465 | B2 | 11/2004 | Biwa et al. |
| 6,818,530 | B2 | 11/2004 | Shimoda et al. |
| 6,858,081 | B2 | 2/2005 | Biwa et al. |
| 6,967,353 | B2 | 11/2005 | Suzuki et al. |
| 7,002,182 | B2 | 2/2006 | Okuyama et al. |
| 7,084,420 | B2 | 8/2006 | Kim et al. |
| 7,087,932 | B2 | 8/2006 | Okuyama et al. |
| 7,154,124 | B2 | 12/2006 | Han et al. |
| 7,208,725 | B2 | 4/2007 | Sherrer et al. |
| 7,288,758 | B2 | 10/2007 | Sherrer et al. |

(Continued)

FOREIGN PATENT DOCUMENTS

| | | | |
|---|---|---|---|
| JP | 2016-66487 | A | 4/2016 |
| KR | 10-1654541 | B1 | 8/2016 |
| KR | 10-1654688 | B1 | 9/2016 |

*Primary Examiner* — Minh D A

(74) *Attorney, Agent, or Firm* — Sughrue Mion, PLLC

(57) ABSTRACT

A light emitting diode (LED) lighting apparatus is provided. The LED lighting apparatus includes a first LED array; a second LED array; a first driving chip configured to receive AC power, and to control the first LED array based on a first control signal; a second driving chip configured to receive the AC power, and to control the second LED array based on a second control signal; a communication device configured to generate the first control signal and the second control signal based on a request from an external device; and an AC/DC converter configured to receive the AC power, and to provide DC power to the communication device.

20 Claims, 11 Drawing Sheets

(56) References Cited

U.S. PATENT DOCUMENTS

| | | | |
|---|---|---|---|
| 7,319,044 B2 | 1/2008 | Han et al. | |
| 7,501,656 B2 | 3/2009 | Han et al. | |
| 7,709,857 B2 | 5/2010 | Kim et al. | |
| 7,759,140 B2 | 7/2010 | Lee et al. | |
| 7,781,727 B2 | 8/2010 | Sherrer et al. | |
| 7,790,482 B2 | 9/2010 | Han et al. | |
| 7,940,350 B2 | 5/2011 | Jeong | |
| 7,959,312 B2 | 6/2011 | Yoo et al. | |
| 7,964,881 B2 | 6/2011 | Choi et al. | |
| 7,985,976 B2 | 7/2011 | Choi et al. | |
| 7,994,525 B2 | 8/2011 | Lee et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,129,711 B2 | 3/2012 | Kang et al. | |
| 8,179,938 B2 | 5/2012 | Kim | |
| 8,263,987 B2 | 9/2012 | Choi et al. | |
| 8,324,646 B2 | 12/2012 | Lee et al. | |
| 8,399,944 B2 | 3/2013 | Kwak et al. | |
| 8,432,511 B2 | 4/2013 | Jeong | |
| 8,459,832 B2 | 6/2013 | Kim | |
| 8,502,242 B2 | 8/2013 | Kim | |
| 8,536,604 B2 | 9/2013 | Kwak et al. | |
| 8,735,931 B2 | 5/2014 | Han et al. | |
| 8,766,295 B2 | 7/2014 | Kim | |
| 8,918,236 B2 * | 12/2014 | Hamilton | B64G 1/244 701/13 |
| 8,928,236 B1 * | 1/2015 | Mays, II | H05B 45/14 315/308 |
| 9,723,681 B2 | 8/2017 | Tsai et al. | |
| 9,894,740 B1 * | 2/2018 | Liszt | H05B 47/19 |
| 10,182,484 B1 * | 1/2019 | Thornton | H05B 47/24 |
| 10,201,055 B2 | 2/2019 | Lee | |
| 10,314,124 B1 * | 6/2019 | Yang | G08C 17/02 |
| 10,492,280 B1 * | 11/2019 | Kwan | H04B 10/1149 |
| 10,531,534 B1 | 1/2020 | Zhou | |
| 10,660,167 B2 * | 5/2020 | Han | H05B 45/20 |
| 2009/0091265 A1 * | 4/2009 | Song | G09G 3/3413 315/297 |
| 2015/0264755 A1 | 9/2015 | Hsia et al. | |
| 2017/0164439 A1 * | 6/2017 | Reed | F21V 9/30 |
| 2019/0350054 A1 * | 11/2019 | Neri | H02M 3/3353 |
| 2020/0120770 A1 * | 4/2020 | Huang | H05B 47/19 |
| 2020/0281058 A1 * | 9/2020 | Sooch | H05B 45/20 |
| 2020/0323057 A1 * | 10/2020 | Adams | H05B 47/185 |

* cited by examiner

LED LIGHTING APPARATUS AND OPERATING METHOD THEREOF

CROSS-REFERENCE TO RELATED APPLICATION

This application claims priority to Korean Patent Application No. 10-2020-0155462 filed on Nov. 19, 2020 in the Korean Intellectual Property Office, the disclosure of which is incorporated by reference herein in its entirety.

BACKGROUND

1. Field

Methods, apparatuses and systems consistent with example embodiments relate to an LED lighting apparatus and an operating method thereof.

2. Description of Related Art

In general, a light emitting diode (LED) has low power consumption and a long lifespan. Accordingly, in recent years, an LED lighting apparatus has been widely used as a backlight light source for display devices, a headlamp for automobiles, or self-emitting display devices. LED lighting apparatuses emit light having a specific correlated color temperature (CCT). In various application environments, it is necessary to vary a color temperature of light emitted from the LED lighting apparatus according to the surrounding environment or the user's request. In order to vary the color temperature of light emitted from the LED lighting apparatus, a color temperature variable device may be implemented through a plurality of LED lighting apparatuses having different color temperatures and a plurality of LED drivers respectively controlling the plurality of LED lighting apparatuses.

SUMMARY

One or more example embodiments provide an LED lighting apparatus that can vary the color temperature and brightness of emitted light, with minimal standby power consumption.

According to an aspect of an example embodiment, an LED lighting apparatus includes a first LED array; a second LED array; a first driving chip configured to receive AC power, and to control the first LED array based on a first control signal; a second driving chip configured to receive the AC power, and to control the second LED array based on a second control signal; a communication device configured to generate the first control signal and the second control signal based on a request from an external device; and an AC/DC converter configured to receive the AC power, and to provide DC power to the communication device.

According to an aspect of an example embodiment, an LED lighting apparatus includes a first LED array configured to emit first light having a first brightness or a first color temperature; a second LED array configured to emit second light having a second brightness or a second color temperature; a driving chip configured to receive AC power, and to control a first driving current of the first LED array and a driving current of the second LED array; a first switching circuit configured to selectively provide the AC power to the first LED array based on a first control signal; a second switching circuit configured to selectively provide the AC power to the second LED array based on a second control signal; a communication device configured to generate the first control signal and the second control signal based on a request received from an external device; and an AC/DC converter configured to receive the AC power, and to provide DC power to the communication device.

According to an aspect of an example embodiment, an operating method of an LED lighting apparatus includes: receiving AC power; converting the AC power to DC power using a buck-converter; providing the DC power to a communication device; generating a plurality of control signals using the communication device; and controlling any one or any combination of brightness and color temperature of a plurality of LED arrays of the LED lighting apparatus based on the plurality of control signals.

BRIEF DESCRIPTION OF DRAWINGS

The above and other aspects, features and other advantages will be more clearly understood from the following detailed description taken in conjunction with the accompanying drawings, in which.

DETAILED DESCRIPTION

Hereinafter, example embodiments will be described with reference to the accompanying drawings.

A light emitting diode (LED) lighting apparatus according to an example embodiment may include an AC/DC converter, LED arrays having at least two different characteristics, an AC direct drive integrated circuit (IC) for driving the LED arrays, and a communication module. The LED arrays may be controlled using a tuning method or a switching method. The tuning method may include independently adjusting a driving current to different LED arrays by using a dimming function of driving ICs connected to the LED arrays. The switching method may include a full-driven current control AC dimming function in which LED arrays having different characteristics that are turned on can be varied through a switching circuit control. The switching method may also include, without using the AC dimming function, changing the color and adjusting the brightness by controlling a turn-on/turn-off ratio of the LED arrays of different characteristics through controlling a switching circuit.

Accordingly, in the LED lighting apparatus according to an example embodiment, standby power due to power supply to a communication module using a high-efficiency AC/DC converter may be significantly reduced. In addition, the LED lighting apparatus according to an example embodiment may satisfy various user's requests through LED dimming and characteristic variations of the LED through a control output signal of the communication module.

Figure 1:
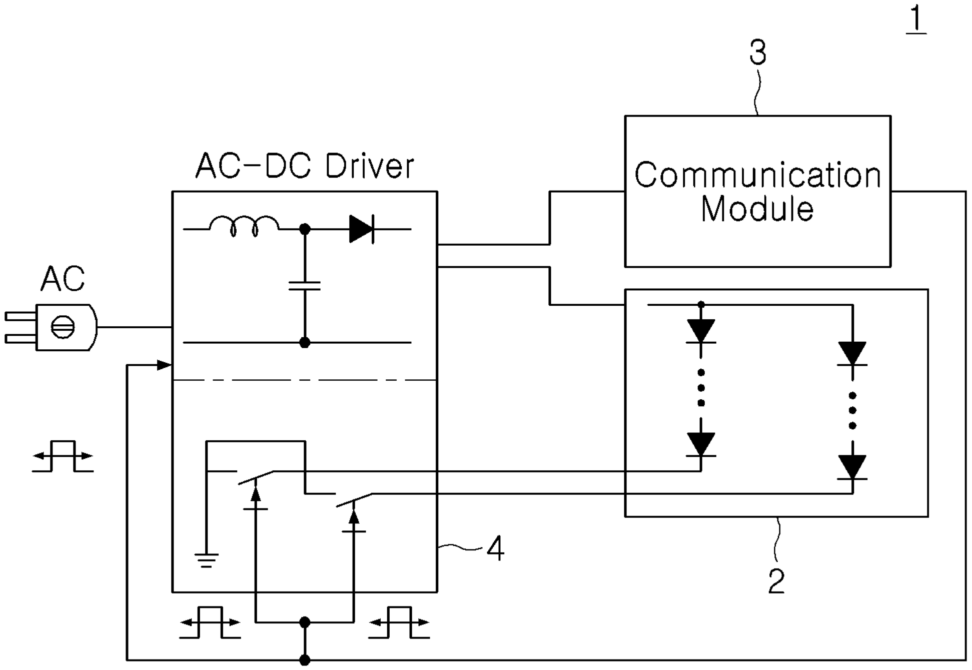
FIG. 1 is a view illustrating an LED lighting apparatus.

FIG. 1 is a view illustrating a light emitting diode (LED) lighting apparatus. Referring to FIG. 1, LED lighting apparatus 1 may include an LED module 2, a communication module 3, and an AC/DC driver 4.

The LED lighting apparatus 1 controls a driver output current using an output of the communication module 3 and the AD/DC driver 4. In addition, the LED lighting apparatus 1 performs color variation of the LED module 2, by controlling a switching circuit using an output of the communication module 3 and the AD/DC driver 4. The AD/DC driver 4 receives AC power, converts the received AC power into driving power for driving the LED module 2, and outputs the converted driving power to the LED module 2.

The communication module 3 uses an internal voltage of a driving integrated circuit (IC) or an external regulator circuit to receive power. However, due to a low circuit efficiency, excessive heat may be generated by the driving IC or the regulator circuit. The excessive heat may damage the LED module 2. Also, standby power required for the LED lighting apparatus 1 may exceed a standard of standby power (for example, 0.5 W or less).

An LED lighting apparatus according to an example embodiment can significantly reduce standby power by providing power to the communication module using a high-efficiency AD/DC converter.

Figure 2:
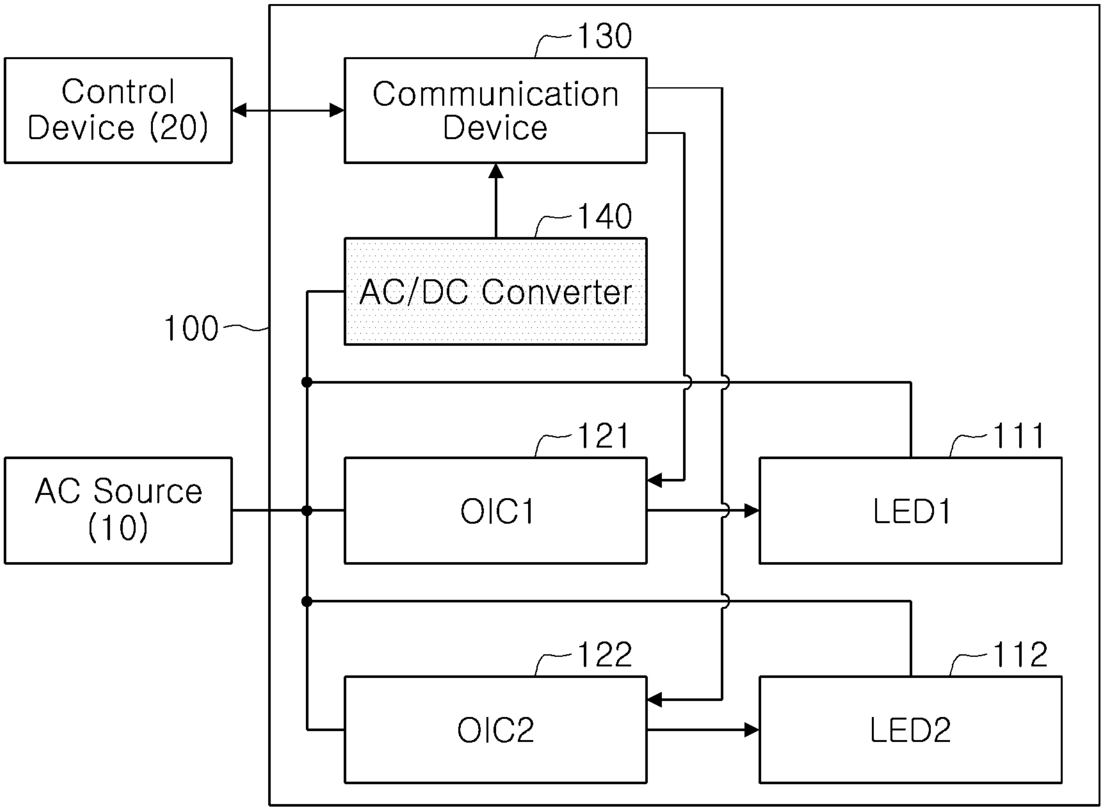
FIG. 2 is a view illustrating an LED lighting apparatus according to an example embodiment.

FIG. 2 is a view illustrating an LED lighting apparatus according to an example embodiment. Referring to FIG. 2, LED lighting apparatus 100 may include a first LED array 111 (LED1), a second LED array 112 (LED2), a first driving chip 121 (OIC1), a second driving chip 122 (OIC2), a communication device 130, and an AC/DC converter 140. In an example embodiment, the first LED array 111 (LED1), the second LED array 112 (LED2), the first driving chip 121 (OIC1), the second driving chip 122 (OIC2), the communication device 130, and the AC/DC converter 140 may be mounted on one substrate.

The first LED array 111 (LED1) may include first LEDs connected in series or in parallel. In an example embodiment, each of the first LEDs may be implemented to output light of a first color temperature.

The second LED array 112 (LED2) may include second LEDs connected in series or in parallel. In an example embodiment, each of the second LEDs may be implemented to output light of a second color temperature. Here, the second color temperature may be different from the first color temperature. For example, the second color temperature may be higher than the first color temperature.

Even if the same current is supplied to the LEDs, an emitted luminous flux of light is different according to the color temperature of the LEDs. For example, with respect to light emitted from the LED with a color temperature of 2700 K, the luminous flux of light emitted from an LED with a color temperature of 3000 K, 3500 K, 4000 K, and 5000 K, respectively, is measured to be 101.5%, 103%, 106.1%, and 109.1%, respectively. Therefore, the luminous flux tends to increase in proportion to the color temperature of light emitted from the LED. That is, the LED having a color temperature of 5000 K generates about 9% higher luminous flux even if the same current is supplied, as compared to the LED having a color temperature of 2700 K.

An LED having a relatively low color temperature can maintain the same luminous flux by supplying more current than an LED having a relatively high color temperature. An LED with a relatively high color temperature can obtain the same luminous flux even if a smaller current is supplied than an LED with a relatively low color temperature. Therefore, even if the amount of current supplied to the LEDs decreases, the total luminous flux of the LED module can be kept constant.

The first driving chip 121 (OIC1) may receive AC power, and may control an operation of the first LED array 111 according to a first control signal of the communication device 130. In an example embodiment, the first driving chip 121 may control brightness or a color temperature of the first LED array 111. For example, the first driving chip 121 may control the first color temperature by controlling the first current provided to the first LED array 111.

The second driving chip 122 (OIC2) may receive AC power, and may control an operation of the second LED array 112 according to a second control signal of the communication device 130. In an example embodiment, the second driving chip 122 may control brightness or a color temperature of the second LED array 112. For example, the second driving chip 122 may control the second color temperature by controlling the second current provided to the second LED array 112.

The communication device 130 may receive a power voltage from the AC/DC converter 140, and may communicate with a control device 20. For example, the communication device 130 may communicate with the control device 20 by a wired or wireless connection. In addition, the communication device 130 may generate first and second control signals for controlling each of the first LED array 111 and the second LED array 112 according to a request of the control device 20.

In an example embodiment, each of the first and second control signals may include a Pulse Width Modulation (PWM) signal, and may be received at a dimming terminal of the first and second driving chips 121 and 122, respectively, to control output currents of direct driving chips 121 and 122.

In an example embodiment, color temperature variation or brightness control may be performed through output current control of the direct driving chips 121 and 122 independently connected to the LED arrays 111 and 112 having different characteristics according to the first and second control signals.

The AC/DC converter 140 may receive AC power from a power source, such as AC source 10, and generate DC power. In an example embodiment, the DC power may be 5 V or 3.3 V. It should be understood that the DC power is not limited thereto. The AC/DC converter 140 may provide a power voltage to the communication device 130. In an example embodiment, the AC/DC converter 140 may include a buck-converter.

The power source 10 may provide AC power. The control device 20 may control the LED lighting apparatus 100, by performing wired or wireless communication with the LED lighting apparatus 100. In an example embodiment, the control device 20 may include a smart phone or an artificial intelligence (AI) speaker.

Each of the first and second direct driving chips 121 and 122 may be connected to the first LED array 111 and the second LED array 112, and by controlling a driving current ratio for each CCT through an output current control, the color variation and full brightness adjustment can be performed.

The LED lighting apparatus 100 according to an example embodiment may include a high-efficiency AC/DC converter 140 to reduce standby power according to the supply of power of the communication device 130. Various operations may be performed according to user inputs by performing LED dimming and varying LED characteristics through control signals of the communication device 130.

Figure 3:
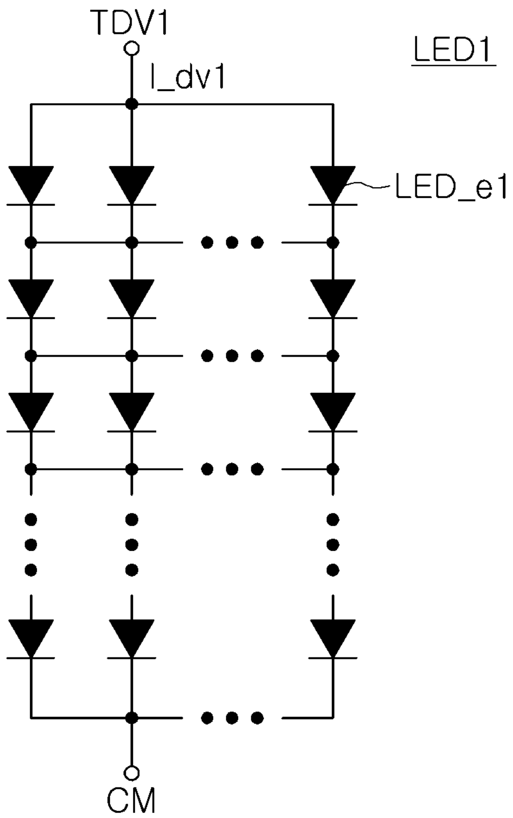
FIG. 3 is a view illustrating an LED array according to an example embodiment.

FIG. 3 is a view illustrating an LED array according to an example embodiment. Referring to FIG. 3, a first LED array LED1 may include a plurality of LED elements LED_e1. Each of the plurality of LED elements LED_e1 may be connected in a series-parallel form between a first distribution current terminal TDV1 receiving a first distribution current I_dv1 and a common terminal CM, as shown in FIG. 3. Each of the plurality of LED elements LED_e1 may emit first light having a first color temperature based on the first distribution current I_dv1.

In an example embodiment, an amount of light emitted from each of the plurality of LED elements LED_e1 varies according to a magnitude of the first distribution current I_dv1. For example, as the magnitude of the first distribution current I_dv1 increases, the amount of light emitted from each of the plurality of LED elements LED_e1 may increase.

The second LED array LED2 may have a form similar to the first LED array LED1 of FIG. 3. For example, a plurality of LED elements included in the second LED array LED2 may be connected in series and parallel between a second distribution current terminal receiving a second distribution current I_dv2 and a common terminal CM. Each of the plurality of LED elements of the second LED array LED2 may emit light having a second color temperature different from the first color temperature based on the second distribution current I_dv2. As a magnitude of the second distribution current I_dv2 increases, an amount of light emitted from each of the plurality of LED elements of the second LED array LED2 may increase.

The first LED array LED1 and the second LED array LED2 shown in FIG. 2 are shown as separate blocks. However, example embodiments are not limited to this. For example, in order to naturalize the total light in which the first light and the second light are combined, each of the LED elements of the first LED array LED1 and the LED elements of the second LED array LED2 may be disposed on the same substrate in a specific pattern or may be disposed to be mixed with each other.

Figure 4:
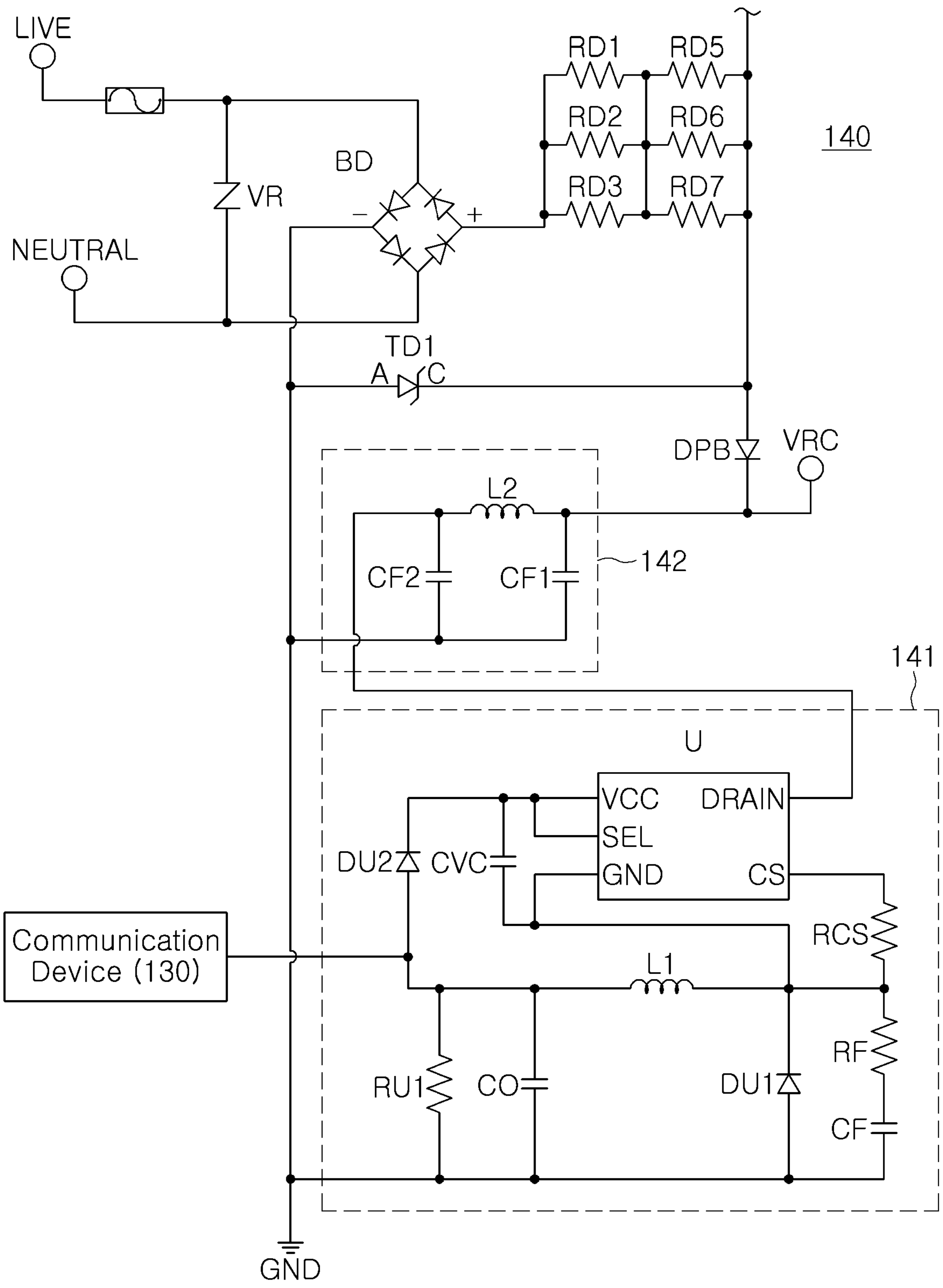
FIG. 4 is a circuit diagram illustrating an AC/DC converter according to an example embodiment.

FIG. 4 is a circuit diagram illustrating an AC/DC converter 140 according to an example embodiment. Referring to FIG. 4, the AC/DC converter 140 may include a buck-converter 141 and an electromagnetic interface (EMI) improvement control filter 142. The AC/DC converter 140 may receive AC power and provide DC power to the communication device 130. For example, the AC power may be received at a live terminal and a neutral terminal, and converted to a DC voltage by diode bridge BD, diode TD1 and resistors RD1, RD2, RD3, RD5, RD6 and RD7.

The buck-converter 141 may include an inductor L1, capacitors CVC, CO, and CF, resistors RU1, RF, and RCS, diodes DU1 and DU2, and a switching circuit U. Here, the switching circuit U may be implemented with a Metal Oxide Silicon Field Effect Transistor (MOSFET) for switching and a logic circuit.

The resistor RU1 may be connected between a power terminal of the communication device 130 and a ground terminal GND. The capacitor CO may be connected between the power terminal of the communication device 130 and the ground terminal GND. A first diode DU1 may be connected between the ground terminal of the switching circuit U and the power terminal of the communication device 130. A second diode DU2 may be connected between the power terminal of the communication device 130 and a power terminal VCC of the switching circuit U. The inductor L1 may be connected between the power terminal of the communication device 130 and the ground terminal of the switching circuit U. The capacitor CF may be connected to the ground terminal GND. The resistor RF may include one end connected to the capacitor CF and the other end connected to the ground terminal of the switching circuit U. The resistor RCS may be connected between a source terminal CS of the switching circuit U and the ground terminal of the switching circuit U. The capacitor CVC may be connected between the power terminal VCC of the switching circuit U and the ground terminal of the switching circuit U. A gate terminal SEL of the switching circuit U may be connected to the power terminal VCC of the switching circuit U. A drain terminal DRAIN of the switching circuit U may be connected to the EMI improvement control filter 142.

It should be understood that the AC/DC converter 140 shown in FIG. 4 is an example, and the AC/DC converter 140 can be implemented in various structures.

The EMI improvement control filter 142 may add an input filter, a capacitor to a switch (between drain-source), a snubber to an output rectified diode, or add an LC filter to the output as a countermeasure against output noise. The LC filter may be implemented with a inductor L2 and capacitors CF1 and CF2, and may be connected between the diode bridge DB and the terminal VRC. Diode DPB may be provided between the EMI improvement control filter 142 and the resistors RD5, RD6 and RD7.

In addition, the LED lighting apparatus 100 shown in FIGS. 2 to 4 controls the LED arrays 111 and 112 in a tuning method. Here, the tuning method refers to independently controlling a driving current by using a dimming function of the driving ICs connected to different LEDs. A control method of the LED array is not limited thereto, and the control method of the LED array may be a switching method.

Figure 5A:
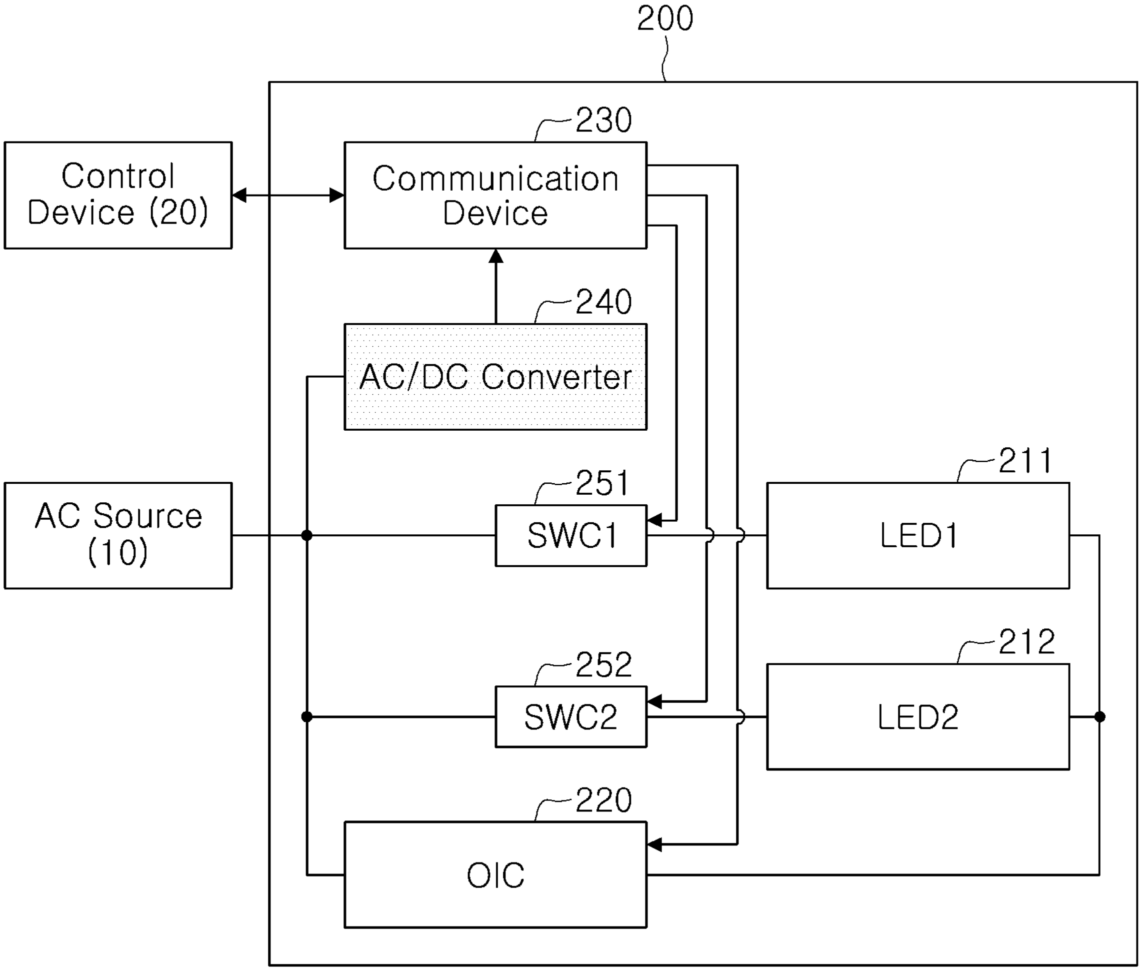
FIG. 5A is a view illustrating an LED lighting apparatus according to another example embodiment.

FIG. 5A is a view illustrating an LED lighting apparatus according to another example embodiment.

Referring to FIG. 5A, LED lighting apparatus 200 may include a first LED array 211, a second LED array 212, a driving chip 220, a communication device 230, an AC/DC converter 240, a first switching circuit 251 (SWC1), and a second switching circuit 252 (SWC2).

The driving chip 220 may receive AC power, control an operation of the first LED array 211 according to a first control signal of the communication device 230, and control an operation of the first LED array 211 according to a second control signal of the communication device 230.

The first switching circuit 251 (SWC1) may determine whether to provide a current to the first LED array 211 based on the first control signal of the communication device 230.

The second switching circuit 252 (SWC2) may determine whether to provide a current to the second LED array 212 based on the second control signal of the communication device.

In an example embodiment, by controlling switching circuits 251 and 252 between the AC power rectified according to a Pulse Width Modulation (PWM) output duty ratio and the first LED array 111 and the second LED array 112, and by controlling a turn-on/turn-off ratio of the first and second LED arrays 111 and 112, color variation may be performed, and brightness adjustment may be performed through one AC driving chip 220.

In FIG. 5A, a control line exists between the communication device 230 and the driving chip 220. However, example embodiments are not limited thereto, and a control line may not be provided between the communication device and the driving chip.

Figure 5B:
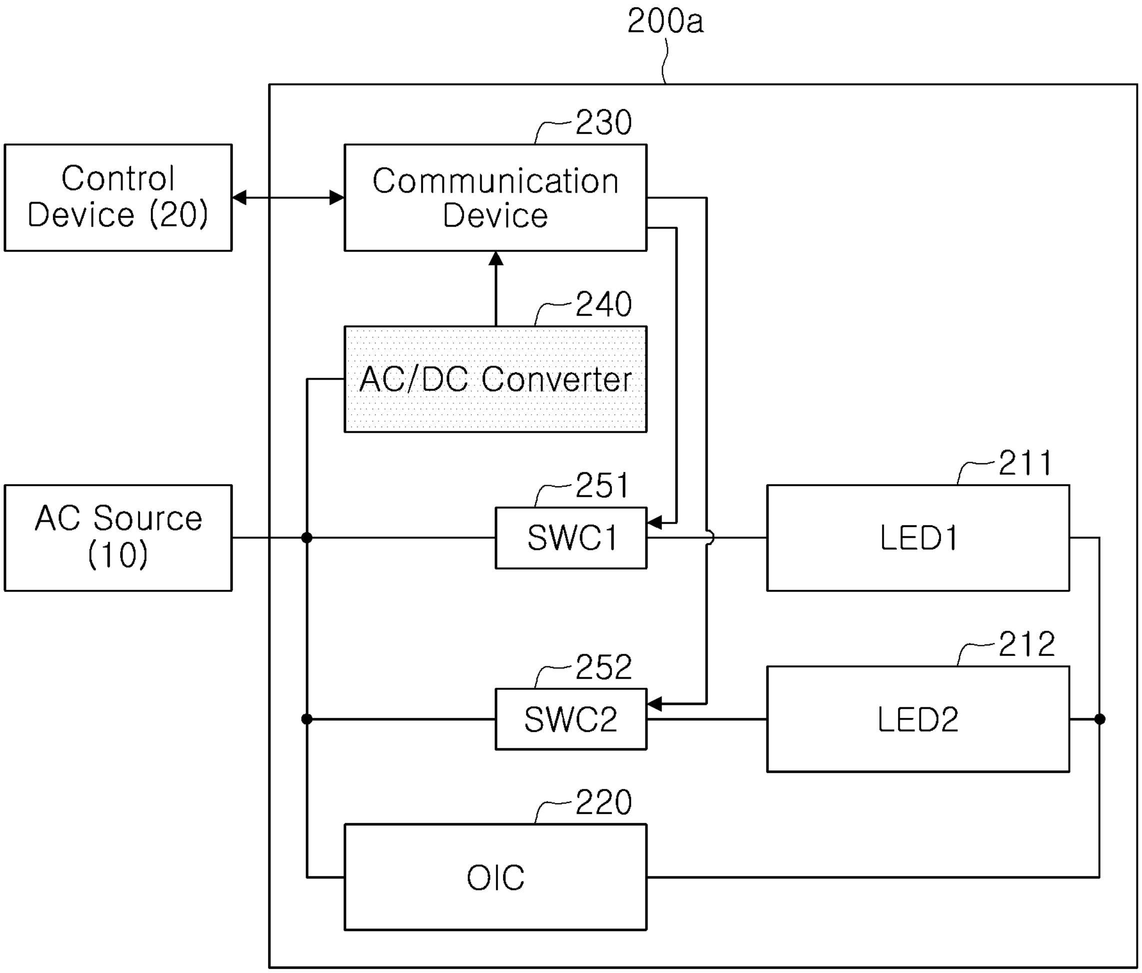
FIG. 5B is a view illustrating an LED lighting apparatus according to another example embodiment.

FIG. 5B is a view illustrating an LED lighting apparatus according to another example embodiment. Referring to FIG. 5B, a control line between the communication device 230 and the driving chip 220 in the LED lighting apparatus 200*a* may be removed from that 200 shown in FIG. 5A.

The LED lighting apparatus 200*a* may vary color and adjust brightness by controlling the turn-on/turn-off ratio of the first switching circuit 251 (SWC1) and the second switching circuit 252 (SWC2).

Figure 6:
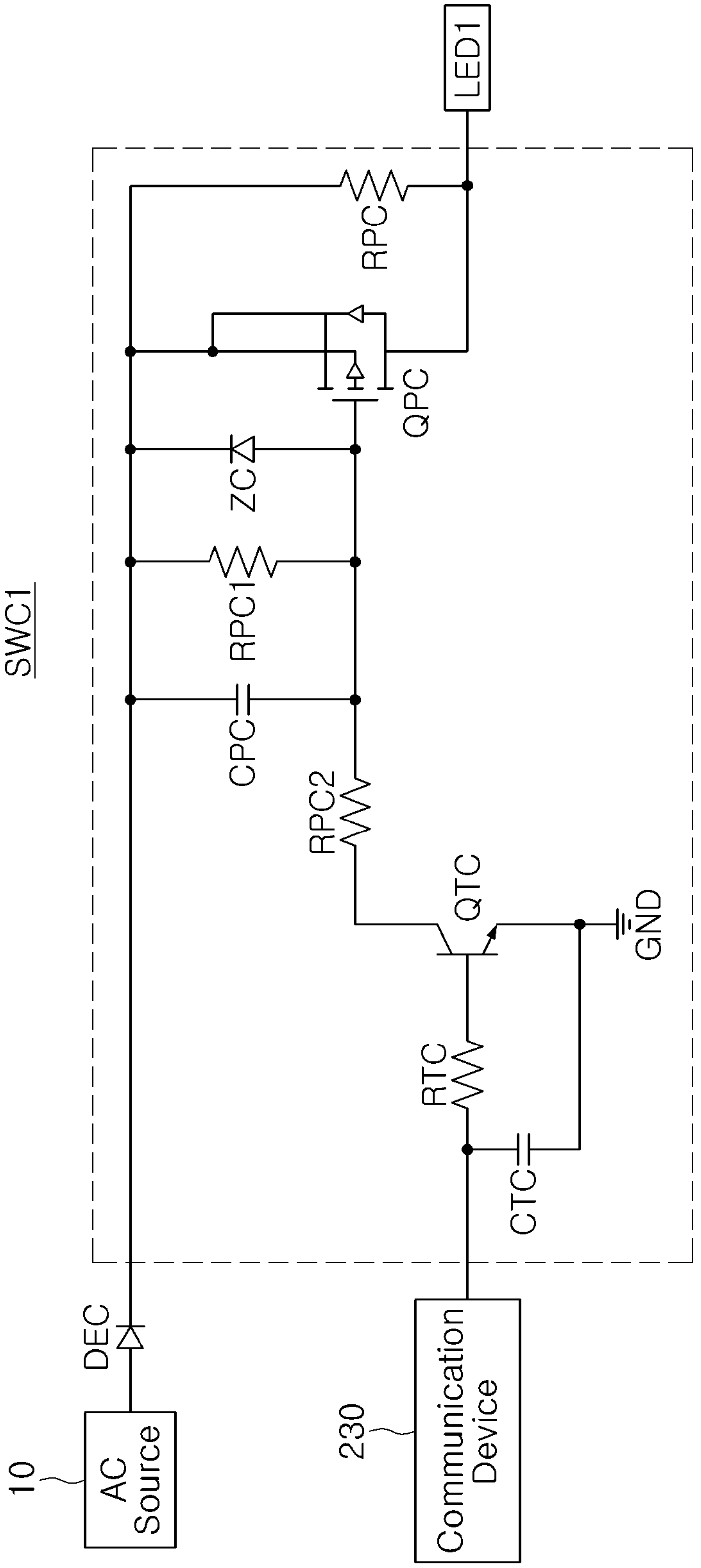
FIG. 6 is a circuit diagram illustrating a switching circuit according to an example embodiment.

FIG. 6 is a circuit diagram illustrating a switching circuit SWC1 according to an example embodiment.

Referring to FIG. 6, the first switching circuit SWC1 may include a transistor QTC, a MOSFET (QPC), a diode ZC, capacitors CPC and CTC, and resistors RTC, RPC, RPC1, and RPC2.

The transistor QTC may include a base for receiving a PWM control signal from a communication device, an emitter connected to the ground terminal GND, and a collector connected to one end of the resistor RPC2. In an example embodiment, the transistor QTC may include a bipolar transistor.

The MOSFET (QPC) may include a gate connected to the other end of the resistor PRC2, a source connected to one end of the resistor RPC, and a drain connected to the other end of the resistor RPC.

The diode ZC may be connected between one end of the resistor RPC and the other end of the resistor RPC2. In an example embodiment, the diode ZC may include a Zener diode.

The capacitor CPC may be connected between one end of the resistor RPC and the other end of the resistor RPC2. In an example embodiment, the capacitor CPC may include a multi-layer ceramic capacitor (MLCC).

The capacitor CTC may be connected between a reception terminal receiving the PWM control signal of the communication device and a ground terminal GND. In an example embodiment, the capacitor CTC may include an MLCC.

The resistor RPC1 may be connected between one end of the resistor RPC and the other end of the resistor RPC2.

The resistor RTC may be connected between a reception terminal receiving the PWM control signal of the communication device and a base of the transistor QTC.

The first switching circuit SWC1 may receive a PWM control signal, and may turn-on/turn-off a corresponding LED array according to the PWM control signal.

The second switching circuit SWC2 may be implemented in the same manner as the first switching circuit SWC1.

In an example embodiment, switching circuits SWC1 and SWC2 may be connected between AC rectified power and the LED arrays 211 and 212 having different characteristics. A diode DEC may be provided between the AC source and the first switching circuit SWC1, and between the AC source and the second switching circuit SWC2.

In an example embodiment, an output converted from the PWM output control signal of the communication device 230 may be provided, through a filter (RC filter), to a signal pin for controlling turning-on/turning-off of the switching circuits SWC1 and SWC2.

For example, when color variation control for turning on the first LED array 211, the second LED array 212, or the first and second LED arrays 211 and 212 is required, the color variation control may be implemented with the output (direct driving IC current control/switching control signal of the LED array 211 and 212) of two communication devices 230.

The LED lighting apparatus according to an example embodiment may further include LED arrays having two different characteristics, an impedance adjustment resistor, and a switching circuit, for additionally reproducing four or more color temperatures. Accordingly, the switching circuit may be connected to the first LED array, the second LED array, the first and second LED arrays, the first LED array and the impedance adjustment resistor of the first LED array, the second LED array and the impedance adjustment resistor of the second LED array, or the first and second LED arrays and the impedance adjustment resistors of the first and second LED arrays according to a communication module control signal, such that more color reproduction may be performed.

Figure 7:
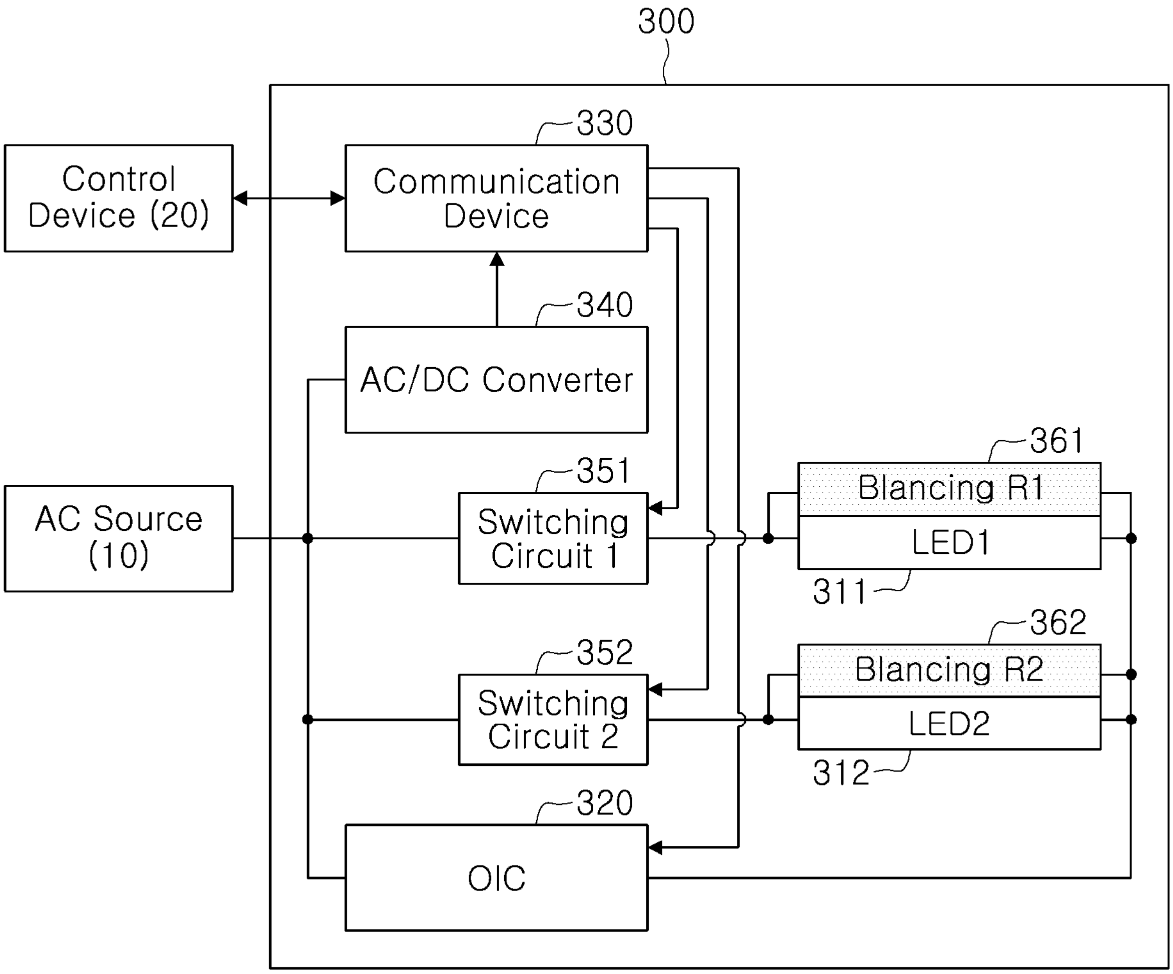
FIG. 7 is a view illustrating an LED lighting apparatus according to another example embodiment.

FIG. 7 is a view illustrating an LED lighting apparatus according to another example embodiment.

Referring to FIG. 7, LED lighting apparatus 300 may include a first LED array 311 (LED1), a second LED array 312 (LED2), a driving chip 320 (OIC), a communication device 330, an AC/DC converter 340, first switching circuit 351, second switching circuit 352, a first balancing circuit 361, and a second balancing circuit 362.

Each of the first LED array 311 (LED1), the second LED array 312 (LED2), the first driving chip 321 (OIC1), the second driving chip 322 (OIC2), the communication device 330, and the AC/DC converter 340 may be implemented in the same manner in the first LED array 211, the second LED array 212, the driving chip 220, the communication device 230, and the AC/DC converter 240.

The first balancing circuit 361 may be implemented to maintain a balance of a current flowing through the first LED array 331. The first balancing circuit 361 may include a balancing resistor connected in parallel to each LED element of the first LED array 311.

The second balancing circuit 362 may be implemented to maintain a balance of a current flowing through the second LED array 332. The second balancing circuit 362 may include a balancing resistor connected in parallel to each LED element of the second LED array 312.

The first switching circuit 351 and the second switching circuit 352 may be connected to the first LED array 311, the second LED array 312, the first LED array 311 and the first balancing circuit 361, the second LED array 312 and the second balancing circuit 362, the first and second LED arrays 311 and 312, or the first and second LED arrays 311 and 312 and the first and second balancing circuits 361 and 362, by switching the LED arrays 311 and 312 and the balancing circuits 361 and 362. Accordingly, a driving current of the first LED array 311 and the second LED array 312 may be adjusted using an impedance difference according to the connection.

The balancing resistor can be used in a CCT switchable structure. Only the specified color temperature can be used for implementation. The balancing resistor may be connected to the LED element and can control the current flowing through the LED element by controlling the impedance to each LED element.

In an example embodiment, the LED array and the balancing resistor may be selected by the first switching circuit 351 and the second switching circuit 352 according to PWM control signals output from the communication device 330. Thereby, a specified color temperature can be implemented. For example, a specified color temperature can be achieved by connecting different combinations of LED arrays and balancing resistors. For example, the first LED array 311 may be connected. For example, the first LED array 311, the first balancing resistor 361 and the second LED array 312 may be selected. For example, the first LED array 311, the second LED array 312 and the second balancing resistor 362 may be selected. For example, the second LED array 312 may be selected.

In the LED lighting apparatus according to an example embodiment, an output voltage of the AC/DC converter 340 may be used to power a sensor or a micro control unit (MCU) using a low voltage DC power as well as the power of the communication module.

The output voltage of the AC/DC converter 340 according to an example embodiment may be provided to other components.

Figure 8:
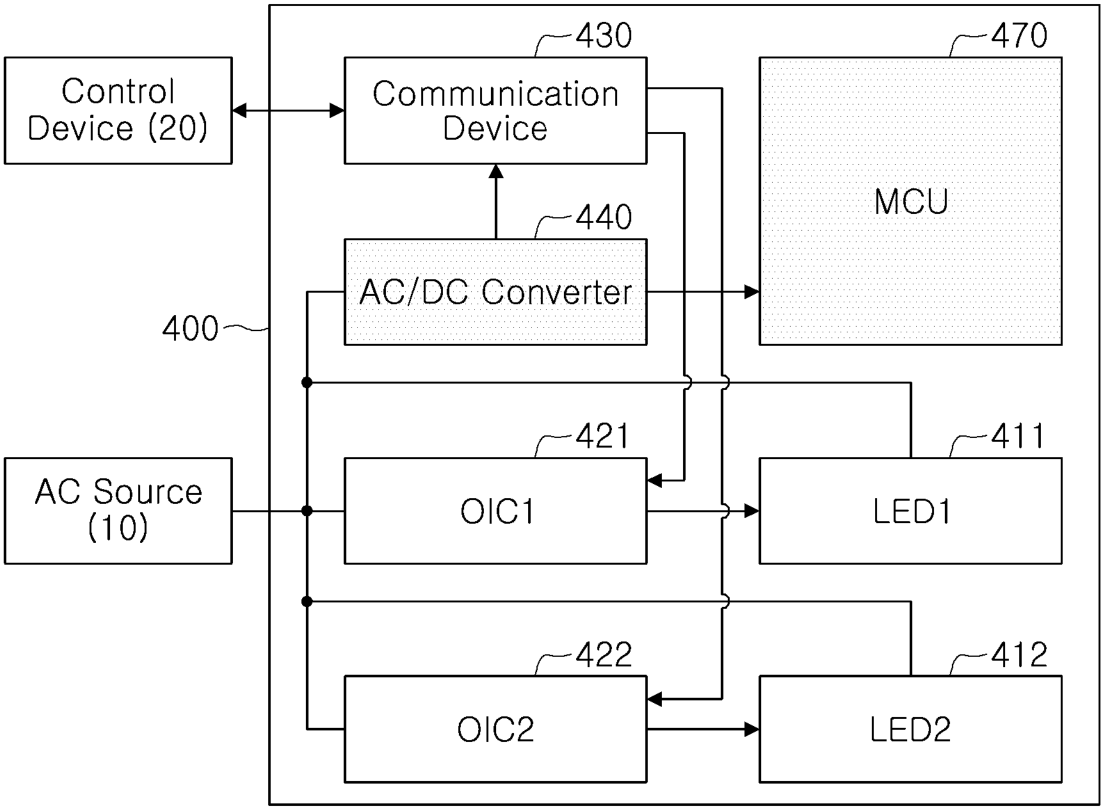
FIG. 8 is a view illustrating an LED lighting apparatus according to an example embodiment.

FIG. 8 is a view illustrating an LED lighting apparatus 400 according to an example embodiment. Referring to FIG. 8, the LED lighting apparatus 400 may include a first LED array 411 (LED1), a second LED array 412 (LED2), a first driving chip 421 (OIC1), a second driving chip 422 (OIC2), a communication device 430, an AC/DC converter 440, and an MCU 470.

The MCU 470 may be implemented to perform an operation required for the operation of the LED lighting apparatus 400. The MCU 470 may receive power from the AC/DC converter 440.

Figure 9:
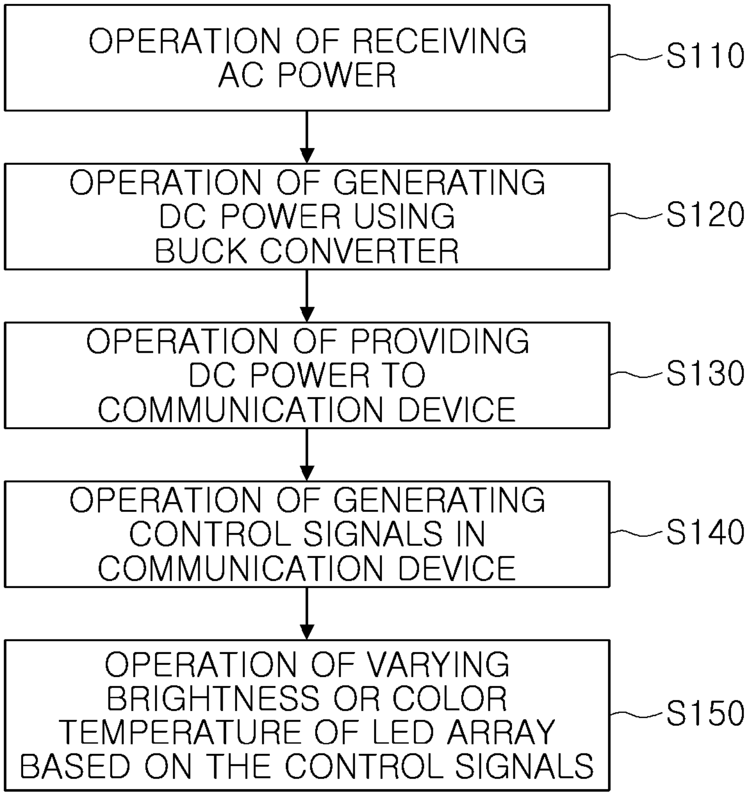
FIG. 9 is a flowchart illustrating a method of operating an LED lighting apparatus according to an example embodiment.

FIG. 9 is a flowchart illustrating an operating method of an LED lighting apparatus according to an example embodiment.

AC power may be received from an external power source 10 (S110). AC power received from an AC/DC converter may be converted into DC power (S120). The converted DC power may be provided to a communication device (S130). The communication device may receive DC power, and generate control signals (S140). Brightness or a color temperature of LED arrays LED1 and LED2 may be adjusted based on the control signals (S150).

In an example embodiment, the communication device may receive request information corresponding to each of the plurality of LED arrays from an external device. In an example embodiment, an EMI improvement control filter may filter a plurality of control signals. In an example embodiment, a driving current corresponding to each of the plurality of LED arrays may be controlled using a tuning method. In an example embodiment, AC dimming of a driving current corresponding to each of the plurality of LED arrays may be performed using a switching method.

In an LED lighting apparatus and an operating method thereof according to an example embodiment, by using an AC/DC converter having a switching method instead of a linear method for a communication module power circuit, circuit efficiency may be improved, and standby power of 0.5 W or less, an energy star standard, may be satisfied.

In addition, in the LED lighting apparatus and the operating method thereof according to an example embodiment, a switching circuit between an LED array and AC power having different characteristics among AC direct driving products and rectified AC power may be provided, and a control signal of the switching circuit and a communication module output signal may be connected to each other.

Figure 10:
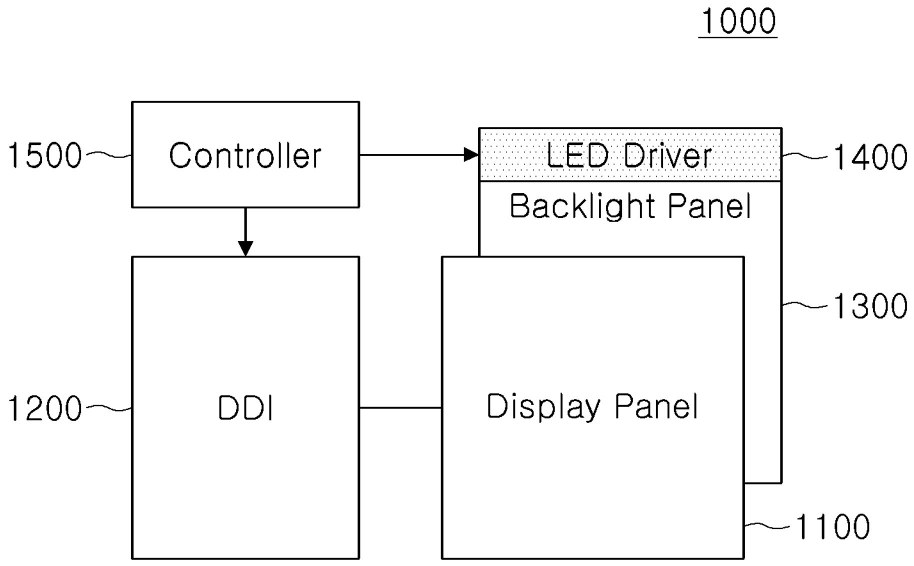
FIG. 10 is a view illustrating a display device including an LED lighting apparatus according to example embodiment.

FIG. 10 is a view illustrating a display device including an LED lighting apparatus according to an example embodiment. Referring to FIG. 10, a display device 1000 may include a display panel 1100, a display driving integrated circuit (DDI) 1200, a backlight panel 1300, an LED driver 1400, and a controller 1500. The display panel 1100 may include a plurality of display pixels. The plurality of display pixels may be connected to a plurality of gate lines and a plurality of data lines, and may be configured to display image information based on signals of the connected lines. In an example embodiment, the plurality of display pixels may be divided into a plurality of groups according to a displayed color. For example, the plurality of display pixels may include red, green, blue, and white display pixels. However, example embodiments are not limited thereto, and the display pixels may further include various colors such as yellow, cyan, and magenta. In an example embodiment, the display panel 1100 may be a liquid crystal display panel.

The DDI 1200 may be configured to control various signal lines (e.g., a plurality of data lines or a plurality of gate lines) connected to the display panel 1100 under control of the controller 1500.

The backlight panel 1300 may output light so that image information may be output through the display panel 1100. In an example embodiment, the backlight panel 1300 may be implemented by one of the LED lighting apparatuses described above with reference to FIGS. 1 to 9 and an operating method thereof.

The LED driver 1400 may be configured to control the backlight panel 1300. The LED driver 1400 may provide a driving current or a distribution current to an LED module so that the backlight panel 1300 emits light having a target color temperature under the control of the controller 1500. The controller 1500 may control the DDI 1300 or the LED driver 1400, to display image information through a plurality of pixels included in the display panel 1200.

In an example embodiment, the apparatus can be applied to various fields to which LED lighting is applied (e.g., an image sensor, a display device, a device, a headlight, or the like).

Figure 11:
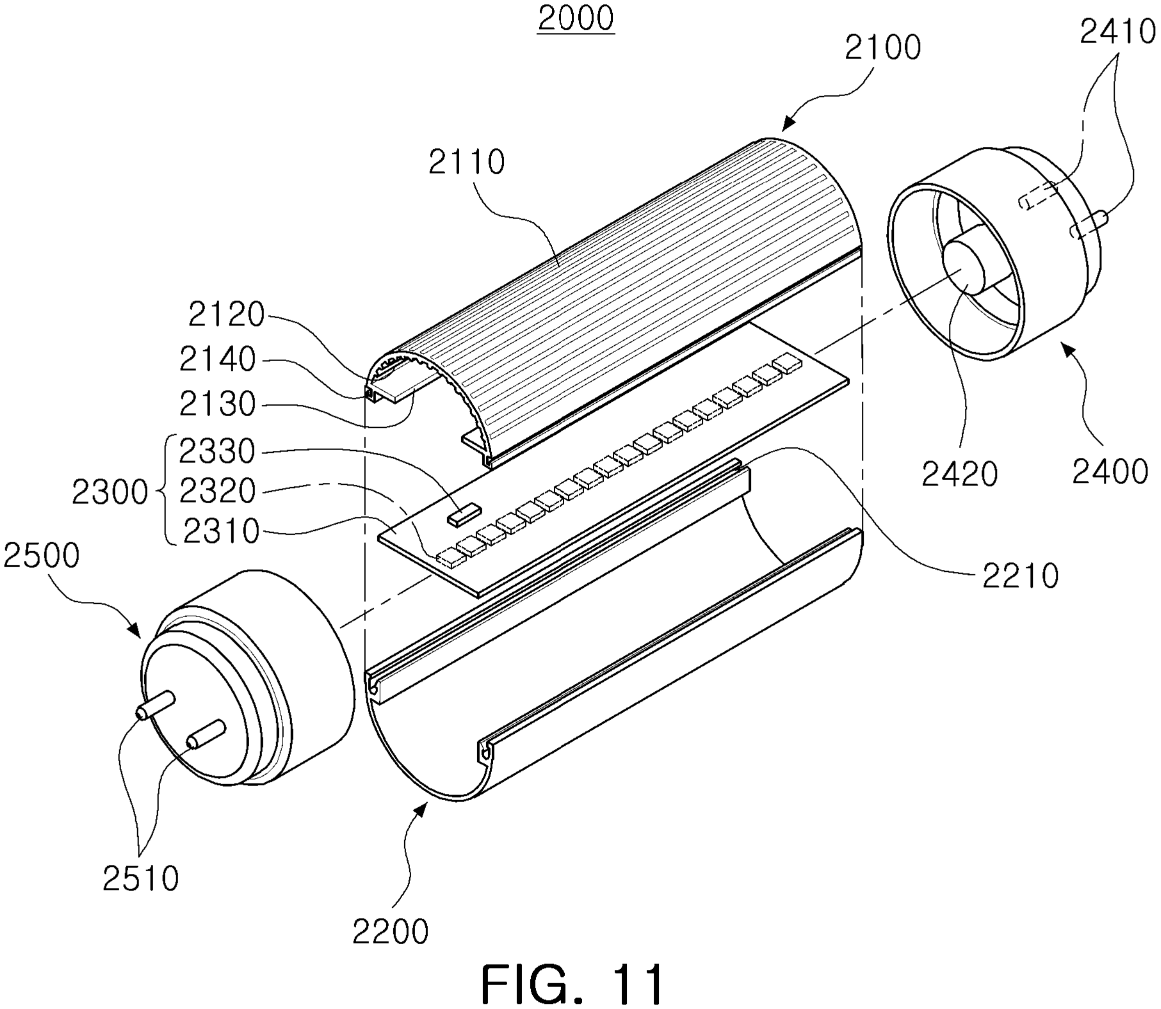
FIG. 11 is an exploded perspective view schematically illustrating a bar-type lamp according to an example embodiment.

FIG. 11 is an exploded perspective view schematically illustrating a bar-type lamp according to an example embodiment. Referring to FIG. 11, lighting apparatus 2000 may include a heat dissipation member 2100, a cover 2200, a light source module 2300, a first socket 2400 and a second socket 2500.

A plurality of heat dissipation fins 2110 and 2120 may be formed in an uneven form on an inner or/and outer surface of the heat dissipation member 2100. The heat dissipation fins 2110 and 2120 may be designed to have various forms and distances. A protruding support 2130 is formed inside the heat dissipation member 2100. A light source module 2300 may be fixed to the support 2130. Locking jaws 2140 may be formed at both ends of the heat dissipation member 2100.

A locking groove 2210 is formed in the cover 2200. The locking jaw 2140 of the heat dissipation member 2100 may be coupled to the locking groove 2210 by a hook coupling structure. A position in which the locking groove 2210 and the locking jaw 2140 are formed may be interchanged with each other.

The light source module 2300 may include a light emitting device array. The light source module 2300 may include a printed circuit board 2310, a light source 2320, and a controller 2330. As described above, the controller 2330 may store driving information of the light source 2320. Circuit wirings for operating the light source 2320 may be formed on the printed circuit board 2310. In addition, components for operating the light source 2320 may be included in the printed circuit board 2310. The controller 2330 may detect power delivered through sockets 2400 and 2500. The controller 2330 may compare the detected power with a predetermined reference range to determine whether a plurality of LEDs included in the light source 2320 are defective.

The first and second sockets 2400 and 2500 are a pair of sockets, and have a structure coupled to both ends of a cylindrical cover unit composed of a heat dissipation member 2100 and a cover 2200. For example, the first socket 2400 may include an electrode terminal 2410 and a power device 2420, and a dummy terminal 2510 may be disposed on the second socket 2500. In addition, an optical sensor and/or a communication module may be embedded in one of the first socket 2400 and the second socket 2500. For example, an optical sensor and/or a communication module may be embedded in the second socket 2500 in which the dummy terminal 2510 is disposed. As another example, an optical sensor and/or a communication module may also be embedded in the first socket 2400 in which the electrode terminal 2410 is disposed.

Figure 12:
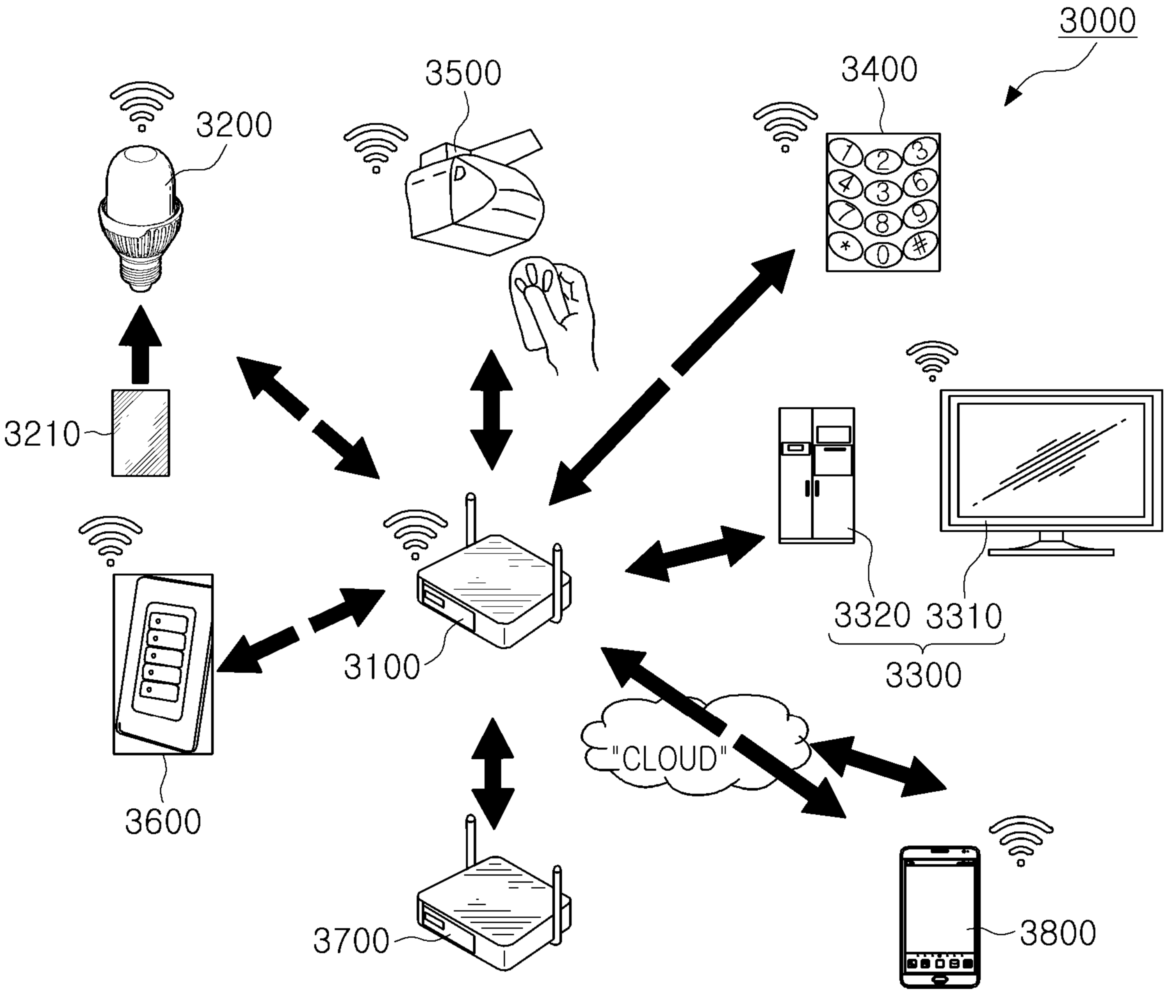
FIG. 12 is a view illustrating a network system having an LED lighting apparatus according to an example embodiment.

FIG. 12 is a view illustrating a network system 3000 having an LED lighting apparatus according to an example embodiment.

Referring to FIG. 12, a network system 3000 may include a gateway 3100 for processing data transmitted and received according to different communication protocols, an LED lamp 3200 connected to communicate with the gateway 3100, and a plurality of devices 3300 to 3800 connected to communicate with the gateway 3100 according to various wireless communication methods. In order to implement the network system 3000 based on the IoT environment, each of the devices 3300 to 3800 including the LED lamp 3200 may include at least one communication module. In an example embodiment, the LED lamp 3200 may be connected to enable communication with the gateway 3100 by a wireless communication protocol such as Wi-Fi, Zigbee, and Li-Fi, and to this end, the LED lamp 3200 may have at least one lamp communication module 3210.

As described above, the network system 3000 can be applied to an open space such as a street or a park as well as a closed space such as a home or an office. When the network system 3000 is applied to the home, a plurality of devices 3300 to 3800 included in the network system 3000 and connected to communicate with the gateway 3100 based on an IoT technology may include a home appliance 3300 such as a television 3310 and a refrigerator 3320, a digital door lock 3400, a garage door lock 3500, a lighting switch installed on walls, or the like 3600, a router for relaying wireless communication networks 3700, mobile devices 3800 such as smartphones, tablets, laptop computers, and the like.

In the network system 3000, the LED lamp 3200 may check an operating status of the various devices 3300 to 3800 using wireless communication networks (Zigbee, Wi-Fi, or the like) installed in the home, or may automatically adjust an illuminance of the LED lamp 3200 itself according to surrounding environments/conditions. In addition, the devices 3300 to 3800 included in the network system 3000 may also be controlled using Li-Fi communication using visible light emitted from the LED lamp 3200.

First, the LED lamp 3200 may automatically adjust the illuminance of the LED lamp 3200 based on surrounding environment information transmitted from the gateway 3100 through the communication module for the lamp 3210, or the surrounding environment information collected from the sensor mounted on the LED lamp 3200. For example, lighting brightness of the LED lamp 3200 may be automatically adjusted according to the type of a program being displayed on a television 3310 or the brightness of the screen. To this end, the LED lamp 3200 may receive operation information of the television 3310 from the communication module for the lamp 3210 connected to the gateway 3100. The lamp communication module 3210 may be modularized integrally with a sensor and/or a controller included in the LED lamp 3200

For example, if a program value indicates a TV program is a human drama, the lighting may be lowered to a color temperature of 12000 K or less, for example, 5000 K, according to the preset setting value, and a color may be adjusted to create a warm atmosphere. Conversely, when the program value indicates the TV program is a comedy program, the network system 3000 may be configured such that the lighting is increased to a color temperature of 5000 K or more, according to the lighting setting value, and is adjusted to a blue-based white lighting.

In addition, when a certain amount of time elapses after the digital door lock 3400 is locked in a state in which there is no person in the home, all the turned-on LED lamps 3200 are turned off to prevent waste of electricity. Alternatively, when a security mode is set through the mobile device 3800 or the like, when the digital door lock 3400 is locked in a state in which there is no one home, the LED lamp 3200 may be maintained in a turned-on state.

The operation of the LED lamp 3200 may also be controlled according to the surrounding environment collected through various sensors connected to the network system 3000. For example, when the network system 3000 is implemented in a building, the lighting is turned on or turned off by combining a lighting and a location sensor and the communication module in the building, and collecting location information of people in the building, or providing the collected information in real time to enable efficient use of facility management and idle spaces. Because a device such as the LED lamp 3200 is disposed in almost all spaces of each floor in the building, various pieces of information in the building may be collected through a sensor provided integrally with the LED lamp 3200, and may be used for facility management, and for the use of the idle space.

By combining the LED lamp 3200 with an image sensor, a storage device, and the communication module 3210 for lamps, the combined elements can be utilized as a device capable of maintaining building security or detecting and responding to an emergency situation. For example when a smoke or temperature detection sensor, or the like is attached to the LED lamp 3200, damage can be minimized by quickly detecting whether or not fire has occurred. In addition, energy may be saved and a pleasant lighting environment may also be provided by controlling the brightness of the lighting in consideration of the external weather, an amount of sunlight, or the like.

As described above, the network system 3000 can be applied not only to closed spaces such as homes, offices, buildings, or the like, but also to open spaces such as streets, parks, or the like. When the network system 3000 is applied to an open space without physical limitations, it may be relatively difficult to implement the network system 3000 due to a distance limitation of wireless communication and communication interference due to various obstacles. By attaching sensors, communication modules, and the like, to each lighting fixture, and using each lighting fixture as an information collecting means and a communication intermediary means, the network system 3000 can be implemented more efficiently in the open environment as described above.

The LED lighting apparatus according to an example embodiment can reduce standby power to 0.5 W or less by supplying power to a communication module using a high-efficiency AC/DC converter. In addition, the LED lighting apparatus may implement various effects desired by various users through performing LED dimming and characteristic variations of LED through a control output signal of the communication module.

The LED lighting apparatus according to an example embodiment may add a communication module and an AC/DC converter (including an EMI improvement control filter) for supplying power to the communication module in an AC direct driving module.

The LED lighting apparatus according to an example embodiment may be implemented with a high-voltage switching circuit, and one AC driving IC between the rectified AC power and each of the LEDs in a structure in which an AC driving IC controlling the LED driving current is connected to each of the LEDs having different characteristics based on a CCT variable method. In an example embodiment, a voltage switching circuit for selecting one driving IC, rectified AC power and LED, and a balance resistor may be further included.

As set forth above, in an LED lighting apparatus and an operating method thereof according to an example embodiment, standby power due to power supply to a communication module using a high-efficiency AC/DC converter may be significantly reduced.

In addition, in the LED lighting apparatus and an operating method thereof according to an example embodiment, various effects desired by various users may be realized through performing LED dimming and characteristic variations of the LED through a control output signal of the communication module.

While example embodiments have been shown and described above, it will be apparent to those skilled in the art that modifications and variations could be made without departing from the scope as defined by the appended claims.

What is claimed is:

1. A light emitting diode (LED) lighting apparatus comprising:

a first LED array;

a second LED array;

a communication device configured to receive DC power and to generate a first control signal having a first Pulse Width Modulation (PWM) control signal and a second control signal having a second PWM control signal, based on a request from an external device;

a first driving chip directly connected to the first LED array, and configured to receive AC power and the first control signal, and to control the first LED array based on the first control signal;

a second driving chip directly connected to the second LED array, and configured to receive the AC power and the second control signal, and to control the second LED array based on the second control signal; and an AC/DC converter configured to receive the AC power, and to provide the DC power to the communication device.

2. The LED lighting apparatus of claim 1, wherein the first LED array is configured to emit light having a first brightness or a first color temperature based on the first control signal, and wherein the second LED array is configured to emit light having a second brightness or a second color temperature based on the second control signal.

3. The LED lighting apparatus of claim 1, wherein each of the first control signal and the second control signal comprises a pulse width modulation (PWM) signal.

4. The LED lighting apparatus of claim 1, wherein the external device comprises an artificial intelligence (AI) speaker or a smart phone, and wherein the communication device is further configured to receive request information about a brightness or a color temperature from the external device.

5. The LED lighting apparatus of claim 1, wherein the AC/DC converter comprises a buck-converter connected between the communication device and the AC power.

6. The LED lighting apparatus of claim 5, wherein the AC/DC converter further comprises an electromagnetic interference (EMI) improvement control filter.

7. The LED lighting apparatus of claim 1, wherein the DC power provided to the communication device by the AC/DC converter is less than 0.5 W while the LED lighting apparatus is operating in a standby mode.

8. The LED lighting apparatus of claim 1, wherein each of the first LED array, the second LED array, the first driving chip, the second driving chip, the communication device and the AC/DC converter are provided on a common substrate.

9. A light emitting diode (LED) lighting apparatus comprising:

a first LED array configured to emit first light having a first brightness or a first color temperature;

a second LED array configured to emit second light having a second brightness or a second color temperature;

a driving chip directly connected to the first LED array and the second LED array, and configured to receive AC power, and to control a first driving current of the first LED array and a driving current of the second LED array;

a first switching circuit configured to selectively provide the AC power to the first LED array based on a first control signal having a first Pulse Width Modulation (PWM) control signal;

a second switching circuit configured to selectively provide the AC power to the second LED array based on a second control signal having a second PWM control signal;

a communication device directly connected to the driving chip, and configured to receive DC power and to generate the first control signal and the second control signal based on a request received from an external device; and an AC/DC converter configured to receive the AC power, and to provide the DC power to the communication device.

10. The LED lighting apparatus of claim 9, wherein the first color temperature is higher than the second color temperature.

11. The LED lighting apparatus of claim 9, wherein each of the first LED array and the second LED array comprises:

LED elements connected in series or in parallel;

a first balancing circuit configured to balance each of the LED elements of the first LED array; and a second balancing circuit configured to balance each of the LED elements of the second LED array.

12. The LED lighting apparatus of claim 11, wherein the first balancing circuit comprises a first balancing resistor connected in parallel with each of the LED elements of the first LED array, and wherein the second balancing circuit comprises a second balancing resistor connected in parallel with each of the LED elements of the second LED array.

13. The LED lighting apparatus of claim 12, wherein each of the first switching circuit and the second switching circuit is configured to select whether to connect a corresponding LED array of a corresponding balancing circuit.

14. The LED lighting apparatus of claim 9, wherein the AC/DC converter comprises:

a buck-converter configured to receive the AC power and to output the DC power; and a noise electromagnetic interface (EMI) improvement control filter configured to filter the first control signal and the second control signal, wherein the buck-converter is connected between the communication device and the AC power.

15. The LED lighting apparatus of claim 9, wherein the DC power is 3.3 V or 5 V.

16. A method of operating a light emitting diode (LED) lighting apparatus, the method comprising:

receiving AC power;

converting the AC power to DC power using a buck-converter;

providing the DC power to a communication device;

providing the AC power to a plurality of driving chips corresponding to a plurality of LED arrays;

generating a plurality of control signals, each having a Pulse Width Modulation (PWM) control signal, using the communication device; and providing the plurality of control signals from the communication device to a driving chip that is directly connected to the communication device;

providing the AC power to the driving chip; and controlling, using the driving chip, any one or any combination of brightness and color temperature of the plurality of LED arrays of the LED lighting apparatus based on the plurality of control signals, wherein each of the plurality of LED arrays is directly connected to the driving chip.

17. The method of claim 16, further comprising receiving request information corresponding to each of the plurality of LED arrays from an external device in the communication device.

18. The method of claim 16, further comprising filtering the plurality of control signals using an electromagnetic interface (EMI) improvement control filter.

19. The method of claim 16, wherein the controlling comprises controlling a driving current corresponding to each of the plurality of LED arrays using a tuning method.

20. The method of claim 16, wherein the controlling comprises performing AC dimming of a driving current corresponding to each of the plurality of LED arrays using a switching method.

* * * * *